(12) United States Patent
Taillant et al.

(10) Patent No.: US 8,979,489 B2
(45) Date of Patent: Mar. 17, 2015

(54) LOW PRESSURE TURBINE FOR AN AIRCRAFT TURBOMACHINE, COMPRISING A SEGMENTED NOZZLE WITH AN IMPROVED DESIGN

(75) Inventors: Jean-Claude Christian Taillant, Vaux le Penil (FR); Alain Dominique Gendraud, Vernou la Celle sur Seine (FR)

(73) Assignee: SNECMA, Paris (FR)

( * ) Notice: Subject to any disclaimer, the term of this patent is extended or adjusted under 35 U.S.C. 154(b) by 658 days.

(21) Appl. No.: 13/300,981

(22) Filed: Nov. 21, 2011

(65) Prior Publication Data
US 2012/0134788 A1    May 31, 2012

(30) Foreign Application Priority Data

Nov. 30, 2010 (FR) ...................... 10 59946

(51) Int. Cl.
    *F01D 25/24*     (2006.01)
    *F01D 9/04*     (2006.01)
    *F01D 11/00*     (2006.01)
    *F01D 25/12*     (2006.01)

(52) U.S. Cl.
    CPC .............. *F01D 9/042* (2013.01); *F01D 11/005* (2013.01); *F01D 25/12* (2013.01); *Y02T 50/675* (2013.01)
    USPC .................. 415/209.2; 415/173.1; 415/173.7; 415/209.3

(58) Field of Classification Search
    CPC ....... F01D 9/042; F01D 25/12; F01D 11/005; Y02T 50/675
    USPC ............. 415/115, 170.1, 173.1, 173.6, 173.7, 415/174.5, 209.2, 209.3
See application file for complete search history.

(56) References Cited

U.S. PATENT DOCUMENTS

| 2,910,269 | A | | 10/1959 | Haworth et al. |
|---|---|---|---|---|
| 5,899,660 | A | * | 5/1999 | Dodd ................................. 415/9 |
| 2007/0231133 | A1 | * | 10/2007 | Bart ........................... 415/209.3 |

FOREIGN PATENT DOCUMENTS

| EP | 1 637 702 | 3/2006 |
|---|---|---|
| FR | 2 846 997 | 5/2004 |

OTHER PUBLICATIONS

French Search Report issued on Jun. 27, 2011 in Patent Application No. FR 1059946 (with Translation of Category of Cited Documents).

* cited by examiner

*Primary Examiner* — Edward Look
*Assistant Examiner* — Juan G Flores
(74) *Attorney, Agent, or Firm* — Oblon, McClelland, Maier & Neustadt, L.L.P.

(57) ABSTRACT

The invention relates to a low pressure turbine (1) of a turbomachine comprising a nozzle (62) belonging to an upstream stage (20B) and a nozzle (162) belonging to a downstream stage (20C), the nozzle (62) forming segments (62*a*) having an external structure (66) comprising:
    a tab (76) bearing radially on a hook (79) fixed to the case,
    a tab (85) bearing radially on a reaming (87) in the case, the tabs (76, 85) delimiting an annular upstream cooling air circulation cavity (91),
    a contact surface (84) extending in the downstream direction from the tab (85) and lined with an abradable element (86) on the inside, the contact surface comprising a downstream end (92) bearing axially on the nozzle (162) and bearing radially on a stop (93) of the case, the contact surfaces (84) delimiting an annular downstream cooling air circulation cavity (94) communicating with cavity (91).

11 Claims, 5 Drawing Sheets

LOW PRESSURE TURBINE FOR AN AIRCRAFT TURBOMACHINE, COMPRISING A SEGMENTED NOZZLE WITH AN IMPROVED DESIGN

TECHNICAL FIELD

This invention relates to a low pressure turbine for a turbomachine, preferably for an aircraft, for example an aircraft turbojet or turboprop.

The invention more particularly concerns the design and layout of segmented low pressure turbine nozzles.

STATE OF PRIOR ART

Segmented low pressure turbine nozzles consist of putting angular segments of the nozzle circumferentially end to end in the case.

Although this technology is very widespread, there is nevertheless a continuous need to optimise the design and layout of these segmented nozzles. In particular, improvements can be made to the way in which the moment due to the force applied by gas on the nozzle blades is resisted, the capacity of reducing leaks in the primary flow between the consecutive stages, on control over the temperature of the existing elements, and also control of clearances at the tip of turbine wheel blades.

SUMMARY OF THE INVENTION

Therefore, the purpose of the invention is to provide a simple, economic and efficient solution at least partially correcting these problems that arise with embodiments according to prior art.

The purpose of the invention to achieve this is a low pressure turbine of a turbomachine comprising a stator provided with a case, a nozzle belonging to an upstream stage and a nozzle belonging to a downstream stage, each of the two stages housed in the case also comprising a bladed mobile wheel arranged downstream from the nozzle of its stage, the nozzle of the upstream stage being segmented so as to form angular nozzle segments each with an external structure from which nozzle blades project radially inwards.

According to the invention, each external structure comprises:
  a first tab bearing radially on a hook on the stator fixed to the case,
  a second tab radially bearing on a reaming in the case, said first and second tabs of the external structures of the segments delimiting an annular upstream cooling air circulation cavity, jointly with said case,
  a contact surface extending in the downstream direction from the second tab and lined with an abradable element on the inside in contact with the mobile wheel of the upstream stage, said contact surface comprising a downstream end bearing axially on the nozzle of said downstream stage and bearing radially on a stop of the case or said nozzle in the downstream stage, the contact surfaces of the external structures of the segments cooperating with said case to delimit an annular downstream cooling air circulation cavity communicating with said upstream cavity.

The invention discloses a design that enables simplified assembly of nozzle segments in the case, given that their external structure comprises not only a plurality of bearing zones on the stator, but also the abradable liner that will be closely matched by the bladed mobile wheel in the upstream stage. Placement in the case is thus facilitated.

Furthermore, the radial bearing of the second tab on the reaming of the case forms an ingenious means of centring the sector relative to this case. This radial bearing on the reaming replaces a more conventional bearing on a hook, for which the temperature control is more difficult. In this case, the reaming provided directly on the case is not only further from the motor centre line and therefore temperature loads on it are less severe, but its reamed shape makes it inherently less sensitive to temperature loads which can also be easily controlled by appropriate sizing of this reaming.

This radial bearing on the reaming combined with the radial bearing of the first tab on the hook provides a means of better resisting the moment due to gas forces applied on the blades during operation of the turbine.

Furthermore, the downstream end of the contact surface produces an axial contact with the downstream nozzle, which satisfactory limits leaks from the primary flow between the two consecutive nozzles. The axial force applied on the blades by gases pushes the upstream nozzle in the downstream direction, accentuating the contact pressure on the downstream nozzle. This axial bearing is more efficient than a conventional radial bearing, for which the contact pressures are subject to large differential expansions. It is thus easy to obtain the required leak tightness.

The selected design also includes communicating upstream and downstream cooling air circulation cavities that control the temperature of adjacent elements due to the air that passes through them. This temperature and cooling control is also conditioned by the good leak tightness between nozzles which is possible with this invention as it has just been described.

Control of clearances at the tip of the mobile wheel blades is also excellent because the abradable liner is arranged on said contact surface which is itself centred precisely by the reaming in the case, and also via said case or nozzle radial stop cooperating with the downstream end of this contact surface. Obviously, the control of clearances at the tip of the blades also depends on good control of the temperature of the adjacent elements, which is also possible with the invention.

Finally, note that due to the axial bearing between the downstream end of the contact surface and the downstream nozzle, the downstream nozzle can be held in place axially due this bearing alone, which simplifies the global design of the turbine.

It would be possible for the downstream stage nozzle to be segmented so as to form angular nozzle segments, or for it to be in the form of a single piece or multi-piece annular part. If it is segmented, its shape may be exactly the same as or similar to that described above for the upstream stage nozzle. Specific features for the invention are then in cascade in the low pressure turbine, at each stage containing a segmented nozzle according to the definition mentioned above. It is also mentioned that when two consecutive nozzles are segmented, the number of angular segments in each is then preferably identical.

Preferably, the nozzle of said downstream stage that may be segmented or annular, has an external structure from which the nozzle blades project radially inwards, said external structure comprising:
  a first annular tab, segmented or not depending on the selected configuration, on which said downstream end of the contact surfaces of the segments bears axially, and
  a second annular tab, segmented or not depending on the selected configuration, delimiting an upstream annular cooling air circulation cavity jointly with said first annular tab and said case, the cavity communicating with said downstream cooling air circulation cavity of the nozzle in the upstream stage.

This characteristic enables uninterrupted air circulation above the two nozzles concerned. Preferably, since the seal provided by the invention for the primary flow is very satisfactory, this air circulation may be uninterrupted over more than two consecutive stages, for example on three or four stages, or even on all stages of the low pressure turbine.

Preferably, the downstream ends of the contact surfaces of the segments in the nozzle in the upstream stage, bearing axially on said first annular tab of the nozzle in the downstream stage, cooperate with this first annular tab to define an annular pressurisation cavity containing cooling air from said downstream cavity, so as to limit the air leakage flow from the upstream cavity of the nozzle in the downstream stage to the primary flow, between the nozzles in the upstream stage and the downstream stage. It is possible to bring in air at a pressure similar to the pressure in the cavity on the upstream side of the nozzle in the downstream stage, into the annular pressurisation cavity, such that the air in the latter upstream cavity does not penetrate or only slightly penetrates into the pressurisation cavity, and therefore does not penetrate or only penetrates very slightly into the primary flow. Thus, the cooling air essentially passes between the downstream cavity of the upstream nozzle and the upstream cavity of the downstream nozzle, for better cooling of the surrounding elements. Furthermore, this cooling air then continues to circulate in the downstream direction, for example through a downstream cavity of the downstream nozzle when this nozzle is equipped with one, as will preferably be the case in this invention.

Preferably, the downstream end of the contact surfaces of the segments in the nozzle in the upstream stage is generally U or C shaped, with the open part facing downstream, the two ends of the U or C bearing axially on said first annular tab of the nozzle in the downstream stage. The pressurisation cavity is thus easily defined inside the U or the C, and the axial contact with the downstream nozzle is thus doubled.

Preferably, for each external structure, said first tab, said second tab and said contact surface are made of a single part with an external ring segment from which nozzle blades project radially inwards.

Preferably, said stop on which said downstream end of the contact surface bears radially, is a reaming made on the case or on the nozzle in the downstream stage. The advantages are then exactly the same or are similar to those described above in relation to the reaming of the case on which the second tab of the segments bears radially.

Preferably, the stator hook on which the first tab of the segments bears radially, is made of a single part with the case or is added onto this case.

Preferably, the case also comprises an axial stop facing said downstream end of the contact surface and at a distance from it, in the direction opposite the nozzle in the downstream stage. This axial stop essentially retains the nozzle in the upstream stage in the upstream axial direction, before installation of the low pressure turbine on the other modules of the turbomachine.

Note that the segmented nozzle specific to this invention may be installed in any stage of the low pressure turbine, or it may even be installed in several stages as mentioned above. For example, in the case of a low pressure turbine with four stages, it may be installed at the second and third stages.

Finally, the invention also relates to a turbomachine, preferably for an aircraft, for example a turbojet or a turboprop, comprising a low pressure turbine of the type described above.

BRIEF DESCRIPTION OF THE DRAWINGS

The invention will be better understood and other details, advantages and characteristics of the invention will become clear after reading the following description given as non-limitative examples with reference to the appended drawings, among which.

DETAILED DESCRIPTION OF PREFERRED EMBODIMENTS

Figure 1:
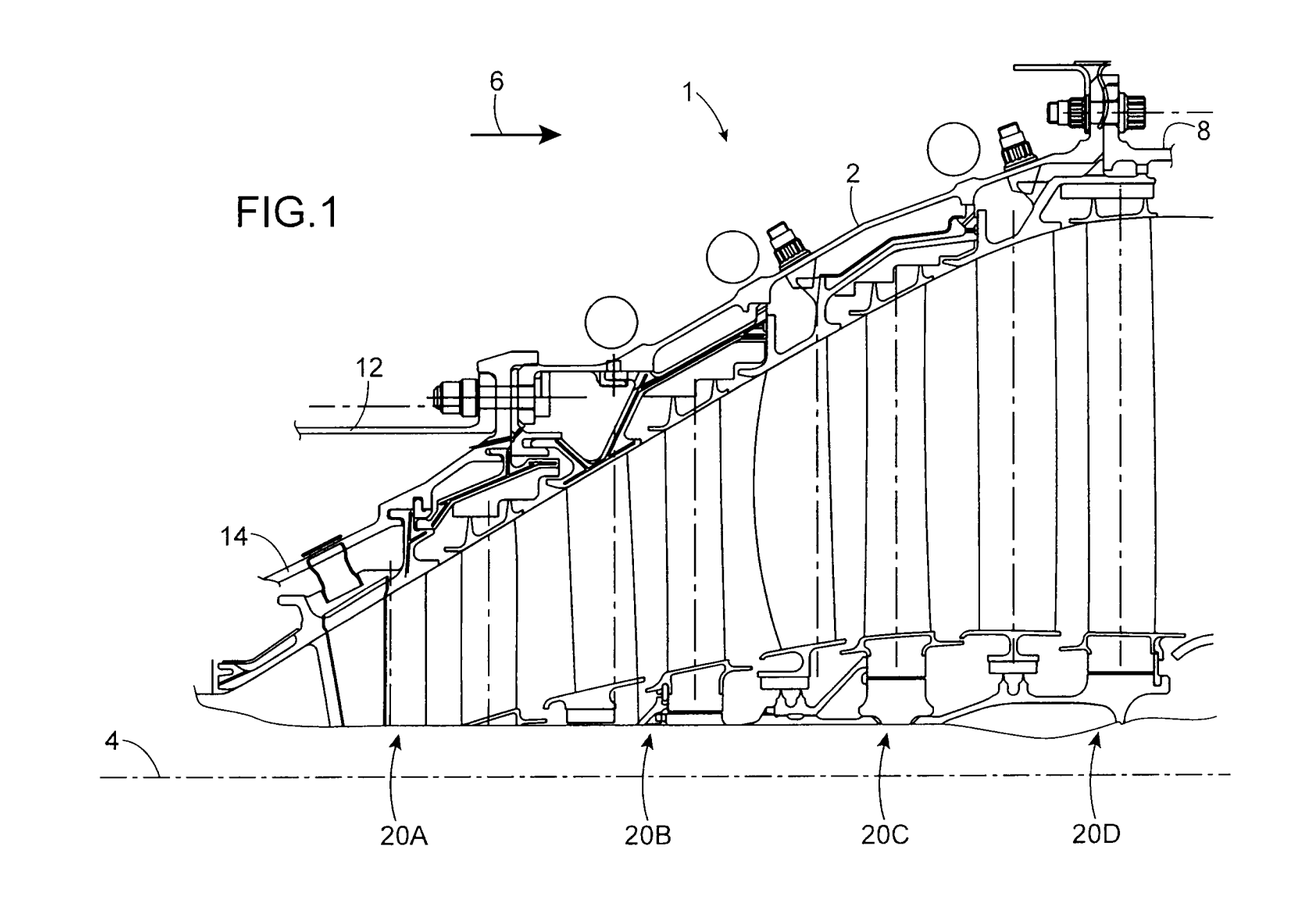
FIG. 1 shows a partial axial half-sectional view of a low pressure turbine in an aircraft turbojet, according to a first preferred embodiment of this invention.

With reference firstly to FIG. 1, the figure shows a low pressure turbine 1 of an aircraft turbojet according to a first preferred embodiment of the invention. The turbojet is preferably of the twin shaft type.

The turbine 1 comprises a stator equipped with a case 2, with a shape of revolution centred on a longitudinal axis 4 of the turbine. The case 2, preferably made of a single piece, is globally tapered outwards towards the downstream direction. Throughout the following description, the terms "upstream" and "downstream" are used with reference to a general direction of gas flow through the turbojet, this direction being shown by the arrow 6.

In the downstream direction, the low pressure turbine case 2 is connected to a gas ejection case 8 through bolted flanges. In the upstream direction, this case 2 is connected to two other concentric cases, always through bolted flanges. These two cases 12 and 14 are deemed to form an integral part of the high pressure turbine that will be arranged on the upstream side of the turbine 1, even if the innermost case 14 surrounds the first stage 20A of the low pressure turbine. This first stage is followed by three other stages 20B, 20C and 20D surrounded by the case 2.

For guidance, note that the case 2 and the four stages 20a, 20B, 20C and 20D form a low pressure module that will be made separately from the ejection module and the high pressure module that integrate the case 8 and the cases 12, 14 respectively.

Conventionally, each turbine stage comprises a nozzle belonging to the stator, and a bladed mobile wheel arranged on the downstream side of the nozzle in its stage. Details of each of these stages will be described below, with reference to FIGS. 2 to 4.

Figure 2:
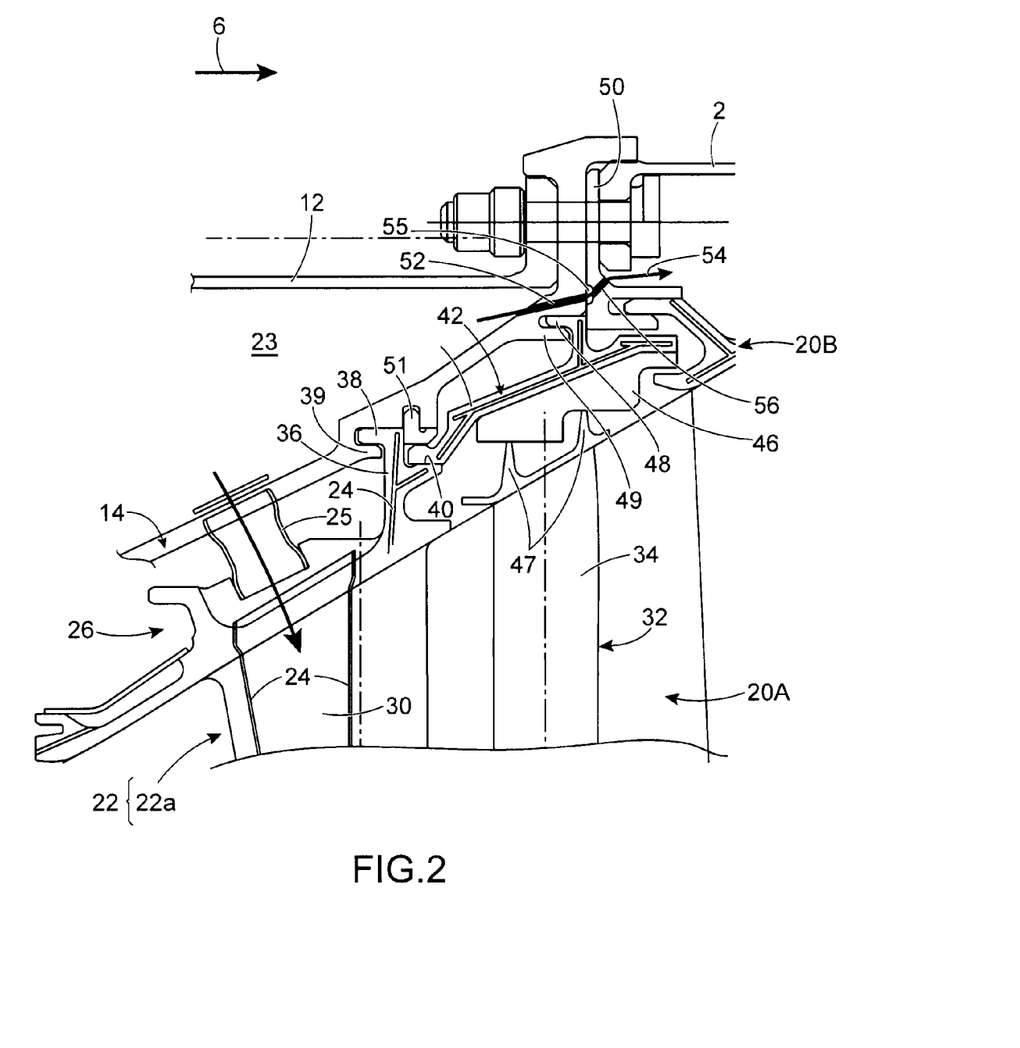
FIGS. 2 to 4 show enlarged views of different parts of the low pressure turbine shown in FIG. 1.

FIG. 2 shows the first stage 20A, the nozzle 22 of which is segmented so as to form angular nozzle segments 22a placed end to end circumferentially. Sealing strips 24 are arranged between the different segments, so as to minimise the gas flow between them.

In this case, each angular nozzle segment 22a has an external structure 26 from which nozzle blades 30 project radially inwards. An internal structure is also provided supporting the blade shanks, and arranged around a hub (not shown) of the bladed mobile wheel 32 of this stage. The blades 34 of the wheel 32 are arranged on the downstream side of the blades 30 of segments 22a.

The external structure 26 extends circumferentially around the angular extent of its associated sector. It has a downstream tab 36 extending radially outwards, the end of which forms an axial hook 38 cooperating with a short axial hook 39 provided in a single piece with the case 14. During operation, radial bearing is provided between these annular hooks 38, 39.

The blades 30 on this first stage 20A are cooled by air originating from the cavity 23 delimited between two cases 12, 14, itself supplied with cooling air from the compressor. This air then circulates through bushings 25 passing through the case 14, and then penetrates inside the hollow blades 30. The small air leakages between the reamings in the case and the bushings 25 that fit into these reamings cool the external structure 26, and particularly the downstream tab 36 and the hooks 38, 39. This gives good control of the temperature and clearances at this first stage. Furthermore, known means of performing the rotation blocking function of nozzle segments 22a relative to case 14 are also provided, such as rotation prevention pins installed on the case 14, without going outside the scope of the invention.

The downstream tabs 36 of the segments together form an annular tab, interrupted by strips 24 between segments. These tabs 36 also include a radial stop 40 on which a segmented or non-segmented annular structure 42 is supported, one contact surface 44 of which extends in the downstream direction from the stop 40 and is lined with an abradable element 46 on the inside in radial contact with the tips of the blades 34. Normally, these tips comprise squealer tips in contact with the abradable element 46, preferably made of a honeycomb material.

The upstream side of the contact surface 44 is provided with an axial hook 48 cooperating with a short axial hook 49 made as a single part with the case 14. In the same way as for hooks 38, 39 mentioned above, radial bearing during operation will take place between these annular hooks 48, 49.

The annular structure 42 including the abradable liner 46 bears axially in the upstream direction on a flange 50, bolted between the assembly flanges of the two cases 2 and 14. Note that the position of this flange 50 between the two cases 2 and 14 makes it easy to replace this flange if necessary.

Furthermore, the nozzle segments 22a are in axial bearing in the downstream direction in contact with a split ring 51 housed in a groove in the case, through their downstream tab 36.

The case 14 has through holes 52 close to its assembly flange and its hook 49, through which cooling air 54 can circulate. This air 54, also originating from the cavity 23 supplied by the compressor, circulates through the holes 52 before penetrating into an annular groove 55 defined between the add-on flange 50 and an axial face of this case 14. This groove reduces the cooling response time of the zone, this cooling being designed in particular to remove heat stored by the hooks 48, 49.

The cooling air 54 is then evacuated in the downstream direction through holes 56 opening up into the groove 55, and formed through the add-on flange 50.

Figure 3:
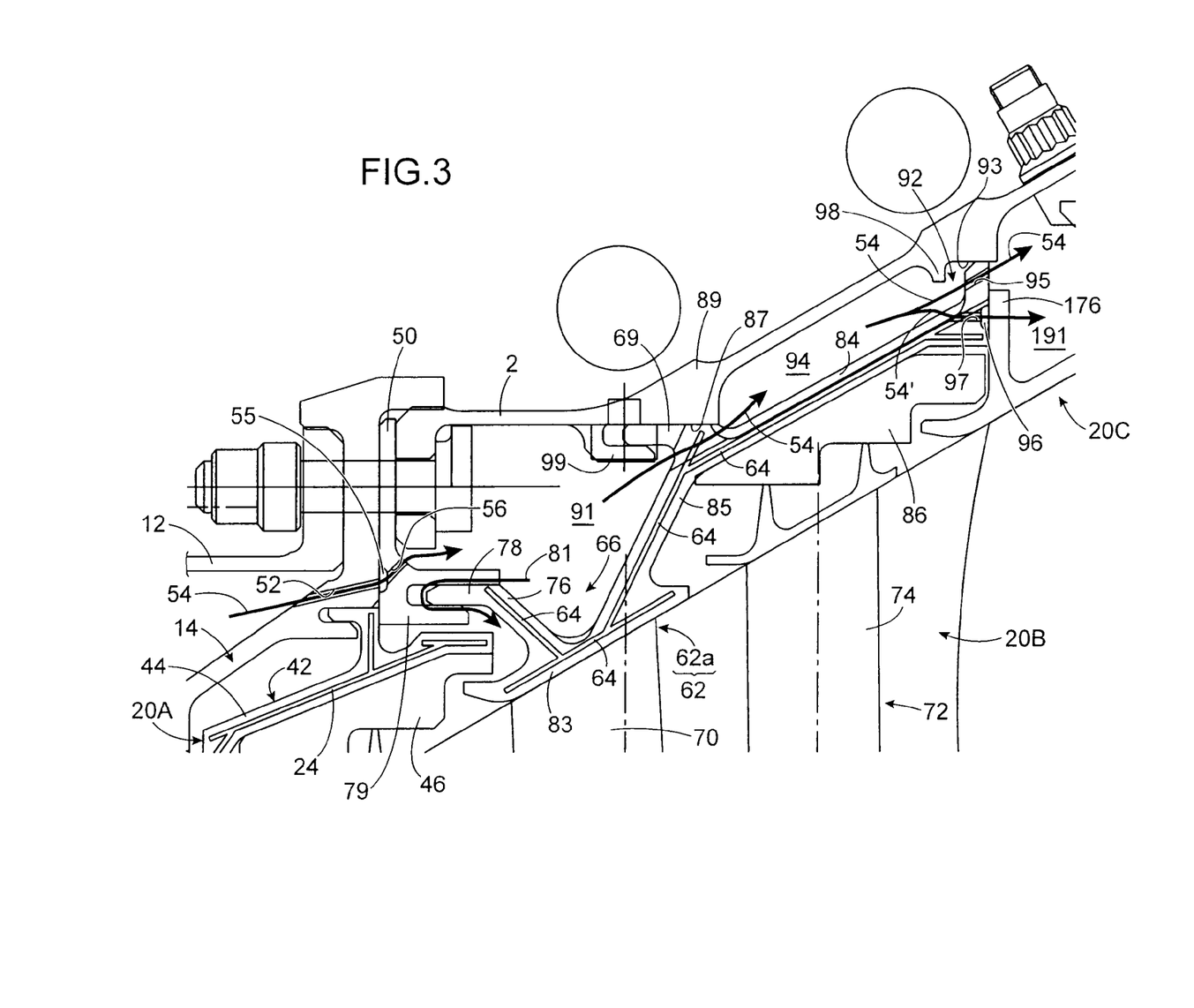

We will now describe the second stage 20B specific to this invention with reference to FIG. 3.

This stage 20B has a nozzle 62 also segmented so as to form angular nozzle segments 62a placed end to end circumferentially. Sealing tabs 64 are arranged between the different segments, to minimise gas flows between them.

In this case, each angular nozzle sector 62a has an external structure 66 from which the nozzle blades 70 project radially inwards. An inner structure is also provided, supporting the blade shanks and arranged around a hub (not shown) of the bladed mobile wheel 72 of this stage. The blades 74 of the wheel 72 are arranged downstream from the blades 70 of the segments 62a.

The external structure 66 extends circumferentially around the entire angular extent of its associated sector. It has an upstream tab 76 extending radially outwards in the upstream direction, the end of which in the form of an axial hook 78 cooperates with an axial hook 79 formed at the internal radial end of the flange 50. During operation, radial bearing is provided between these annular hooks 78, 79, the hook 78 being in internal radial contact with the hook 79. Since this contact is not necessarily perfect due to manufacturing tolerances and thermal expansion, air 54 coming out of holes 56 may pass through this contact as shown by arrow 81, which flows in the direction of the primary flow passing through the nozzle blades and the vanes of the mobile wheels. This evacuates heats stored by the hooks 78, 79. The fact that the cooling air firstly passes through the holes 52, 56 and the groove 55 also contributes to cooling of these hooks 78, 79, for which the contact surface 44 of the annular structure 42 also acts as a thermal shield, as can be seen in FIG. 3.

The upstream tabs 76 of the segments jointly form an upstream annular tab interrupted by inter-sector tabs 64. They are added radially inwards on an external ring sector 83 delimiting the primary flow, the segments 83 together forming the external ring of the structure 66 from which the blades 70 extend.

Each structure 66 is also fitted with a downstream tab 85 downstream from tab 76, extending radially outwards and in the downstream direction from the ring sector 83, and for which the external end in operation bears radially on a reaming 87 of the case 2, formed at an inner protuberance 89 on it. The heat absorbed by this protuberance originating from the downstream tab 85 can easily be controlled by controlling its size.

Apart from the fact that this radial bearing facilitates centring of the nozzle, it also acts in an innovative manner in combination with the radial bearing of hooks 78, 79, to resist the moment due to the gas forces on the blades of the sector 62a. The case thickness may be modulated above this reaming, so as optimise the mechanical strength and the thermal response time of the reaming 87.

The downstream tabs 85 of the segments together form a downstream annular tab interrupted by inter-sector tabs 64.

Thus, the downstream annular tab 85, the upstream annular tab 76, the external ring 83, the flange 50 and the annular portion of the case 2 extending to the right of these elements together form an upstream annular cooling air circulation cavity 91, inside which air 54 penetrates through holes 56, and circulates so as to cool all adjacent elements.

Air 54 then propagates in the downstream direction by passing through and cooling the radial contact between the tab 85 and the reaming 87, passing through crescent-shaped openings (not shown) formed on either one and/or the other of these two elements.

A contact surface 84 is provided for each external structure 66, tapered outwards in the downstream direction starting from an external portion of the downstream tab 85. This contact surface 84 is lined with an abradable element 86 on the inside in radial contact with the tips of the blades 74. In this case also, these tips comprise squealer tips in contact with the abradable element 86, preferably made of a honeycomb material.

At its upstream end, the contact surface 84 can merge with the end of the downstream tab 85 to form a radial bearing in contact with the reaming of the case 87, as shown in FIG. 3. At its downstream end 92, the contact surface 84 is firstly in axial bearing on an upstream annular tab 176 of the nozzle in the third turbine stage 20C. This axial force applied on the blades 70 by gases pushes the nozzle 62 in the downstream direction, increasing the contact pressure between the downstream end 92 and the upstream annular tab 176 of the turbine stage 20C.

This slight axial translation movement of the nozzle segments 62a relative to the case 2 is possible due to centring by reaming 87 made on this case. This gives a satisfactory seal at the inter-nozzle junction.

Furthermore, to prevent the downstream end 92 from opening too far outwards in the radial direction, this movement is stopped by a radial stop formed on the case 2, which in this case is in the shape of a reaming 93 with a design similar to the design of reaming 87.

The contact surfaces 84 of the segments 62a jointly form an annular element interrupted by sealing strips 64. This annular contact surface element 84 forms a downstream annular cooling air circulation cavity 94 jointly with the annular portion of the case 2 extending adjacent to it, inside which air 54 penetrates through the above-mentioned crescent-shaped openings from the upstream cavity 91, and circulates in order to cool all adjacent elements.

Air 54 then propagates in the downstream direction passing through the downstream end 92 through air passage holes 95 formed on this end 92, enabling cooling air 54 to reach the third stage 20C. Temperature loads on the radial contacts observed at the reamings 87 and 93 are not severe due to the innovative design of these contacts, their distance from the turbine axis, and because the contact surfaces 84 also act as a thermal shield for these contacts as can be seen in FIG. 3. Furthermore, the passage of cooling air 54 at these contacts enables control of their temperature.

The downstream end 92 of each contact surface 84 may have a special configuration which will now be described in detail, to further limit leaks of cooling air 54 towards the primary flow, after it exits from the passage holes 95 located radially outwards from the upstream annular tab 176.

This downstream end 92 is generally U- or C-shaped opening in the downstream direction, the two ends bearing axially on the upstream annular tab 176. Apart from the fact that this design doubles the axial bearing of the nozzle 62 in contact with the upstream annular tab 176, the inside of the U or the C forms an annular pressurisation cavity 96 with this tab 176, supplied with cooling air 54 originating from the downstream cavity 94. Passage holes 97 provided for this purpose are made through the U or C shape base.

The purpose of this cavity 96, that resembles a simple groove with a section much smaller than the section of the downstream cavity 94, is to minimise the air leakage flow from holes 95 in the direction of the primary flow. Air 54' is effectively introduced through the holes 97 into the annular pressurisation cavity 96 at a pressure similar to the air pressure output from holes 95, such that this air 54 output from the holes 95 does not penetrate into or only slightly penetrates into the pressurisation cavity 96, and therefore does not penetrate or only slightly penetrates into the primary flow. Thus, the pressurisation cavity 96 only consumes a small amount of air due to its supply calibrated by small holes, consequently the cooling air 54' dedicated to its operation and then evacuated in the primary flow is limited, which maintains a high efficiency main cooling air flow 54 for the downstream stages 20C and 20D. In other words, from the downstream cavity 94, cooling air 54 essentially passes through the holes 95 for better cooling of the surrounding elements.

Regardless of whether the downstream end is in single or in double axial bearing in contact with the tab 176, it may be machined so as to reinforce the seal, for example such that each bearing is convex and "arc"-shaped in the axial direction. During operation, this arc shape becomes approximately straight due to temperature gradients, thus creating good axial bearing with the adjacent part.

Note that for each nozzle sector 62a, the upstream tab 76 namely the first tab, the downstream tab 85 namely the second tab, the contact surface 84 integrating the downstream end 62 and the external ring sector 83 are made from a single piece, for example by moulding and then machining.

For this second stage 20B, it may be associated with means for supporting it relative to the case 2 when the low pressure turbine module at the end of the assembly is not yet mounted on the adjacent ejection and high pressure turbine modules. An axial stop 98 facing the downstream end 62 of the contact surface 84 in the axial direction and at a distance from it may also be provided in the direction opposite to the direction of the next downstream stage 20C. Therefore this axial stop 98 made in a single piece with the case 2 from which it projects inwards close to the reaming 93 is designed to retain the nozzle segments 62a through contact with the downstream end 92 of the contact surfaces 84. Nevertheless, this axial contact is designed only to be active, if necessary, before assembly of the modules, and remains inactive during operation of the low pressure turbine that pushes segments 62a in the axial direction in the opposite direction, in other words in the downstream direction.

In this respect, note that this axial retention in the upstream direction retains all elements in stages 20B, 20c, 20D that bear on this nozzle 62. The axial retention in the other direction (the downstream direction) makes use of an appropriate tool installed in the place of the ejection case 8. The axial retention of the first stage 20A (the most upstream) is also done using an appropriate tool installed in the place of the high pressure turbine case 14.

Furthermore, the downstream tabs 85 may be provided with an axial hook 69 close to the end in radial contact with the reaming 87, cooperating with an axial hook 99 made as a single piece with the case 2. Nevertheless, the radial contact between these two annular hooks 69, 99, is designed solely to be active before assembly of the downstream stage 20C, to prevent radial tipping of the nozzle segments 62a in the downstream direction, but this contact remains normally inactive during operation of the low pressure turbine during which tipping is prevented differently, by axial contact with the downstream tab 176 of stage 20C.

The hook 69 may be toothed to enable pins (not shown) mounted on the case, for example by screwing, to pass through, the function of the pins being to block rotation of nozzle segments about the turbine axis.

Figure 4:
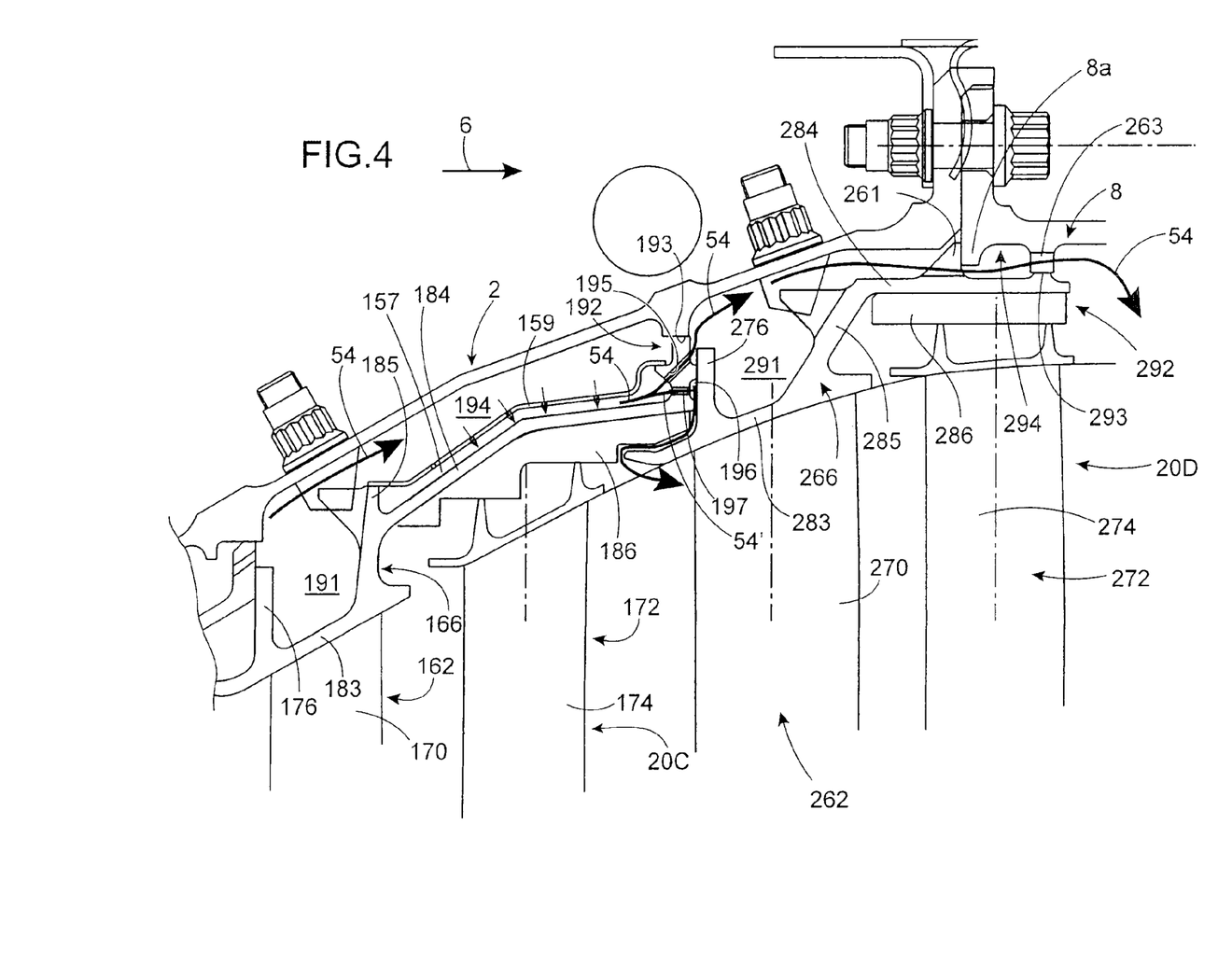

Now with reference to FIG. 4, we will describe the third stage 20C naturally forming a stage downstream from the second upstream stage 20B that has just been described. These two upstream and downstream stages 20B, 20C have some similarities. Thus, each element in stage 20C that is identical to or similar to an element in stage 20B is assigned a numeric reference formed by adding "1" hundred to the number of the element in the stage 20B.

Stage 20C has a nozzle 162 that is not segmented but is annular, for example being made in a single piece.

The nozzle 162 has an annular external structure 166 from which the nozzle blades 170 project radially inwards. An annular structure is also provided, supporting the blade shanks and arranged around a hub (not shown) of the bladed mobile wheel 172 of this stage. The blades 174 of the wheel 172 are arranged downstream from the nozzle blades 170.

The external structure 166 has the upstream tab 176 already described that extends radially outwards and in the upstream direction. However, in this case, the free end of the upstream tab 176 is not hook shaped and is facing the case 2 and at a radial distance from it, since no contact is desired with this case.

The upstream annular tab 176 extends radially from an external ring 183 delimiting the primary flow on which the blades 170 are added.

The structure 166 also presents a downstream annular tab 185 downstream from the tab 176, extending radially outwards and in the downstream direction from the ring 183. Therefore its external end is also facing the case 2 and at a distance from it, since no contact is desired with this case.

Thus, the downstream annular tab 185, the upstream annular tab 176, the external ring 183 and the annular portion of the case 2 extending adjacent to these elements jointly form an upstream annular cooling air circulation cavity 191, in which air 54 penetrates through the holes 95 and circulates in order to cool all adjacent elements.

Air 54 then propagates in the downstream direction above the tab 185, under the case 2, close to a conventional anti-rotation system of the nozzle, comprising pins mounted on the case.

For each external structure 166, a contact surface 184 is provided extending to be generally tapered outwards in the downstream direction from a median portion of the downstream tab 185. This contact surface 184 is lined with an abradable element 186 on the inside in radial contact with the tips of the blades 174. In this case also, these tips are fitted with squealer tips contacting the abradable element 186, preferably made of a honeycomb material.

At its downstream end 192, the contact surface 184 is firstly in axial bearing on an upstream annular tab 276 of the nozzle of the fourth stage of the turbine 20D. The axial force applied on the blades 170 by the gases pushes the nozzle 162 in the downstream direction, increasing the contact pressure between the downstream end 192 and the upstream annular tab 276 of the turbine stage 20D. This assures a satisfactory seal at the inter-nozzle junction.

Furthermore, to prevent the downstream end 192 from opening excessively outwards in the radial direction, this movement is stopped by a radial stop formed on the case 2 which in this case is in the form of a reaming 193 centred on the turbine axis.

The annular contact surface 184 forms a downstream cooling air circulation annular cavity 194 jointly with the annular portion of the case 2 that is extending adjacent to it, inside which air 54 penetrates from the radial end of the downstream tab 185. A multi-perforated annular plate 159 is placed around the contact surface 184 at a small radial distance to create cooling of this contact surface by impact on it. The multi-perforated plate 159 bears on the radial end of the downstream tab 185 and on the downstream end 192 of the contact surface 184. It forms a cavity 157 inside which air 54, after impact on the contact surface 184, then propagates in the downstream direction passing through the downstream end 192 through air passage holes 195 formed on this end 192, enabling cooling air 54 to reach the fourth stage 20D. The temperature loads on the radial contact observed at the reaming 193 are not severe due to its innovative design, its distance from the turbine axis and because the annular contact surface 184 also acts as a thermal shield, as can be seen in FIG. 4. Furthermore, the cooling air passage 54 at this contact enables temperature control. Also the air passage 54 in the cavity 194 limits the thermal expansion of the contact surface 184 that delimits this cavity, so that the clearance with the tips of blades 174 can be controlled.

To further limit leaks of cooling air 54 in the direction of the primary flow after it exits from the passage holes 195 opening up radially outwards from the upstream annular tab 276, the downstream annular end 192 may have a particular configuration which will now be described.

This downstream end 192 adopts a generally U- or C-shaped section open in the downstream direction, the two ends bearing axially on the upstream annular tab 276. Apart from the fact that this design doubles up the axial bearing of the nozzle 162 on the upstream annular tab 276, the inside of the U or the C shape and this tab 276 jointly form an annular pressurisation cavity 196 supplied with cooling air 54 originating from the downstream cavity 157. Passage holes 197 provided for this purpose are formed through the U- or C-shape base.

The purpose of this cavity 196 is similar to the purpose described for cavity 96 downstream from the second stage 20B, namely to minimise the air leakage flow from holes 195 in the direction of the primary flow. Air 54' is effectively introduced through the holes 197 into the annular pressurisation cavity 196 at a pressure similar to the air flow output from the holes 195, such that this air 54 output from the holes 195 does not penetrate or only slightly penetrates into the pressurisation cavity 196, and therefore does not penetrate or only slightly penetrates into the primary flow. Thus, since the pressurisation cavity 196 only consumes a small amount of air because its supply is calibrated by small holes, cooling air 54' dedicated to its operation and subsequently evacuated in the primary flow is limited, which maintains a high efficiency main cooling air flow 54 for the downstream stage 20D. In other words, cooling air 54 from the downstream cavity 157 transits essentially through holes 195, to improve cooling of surrounding elements.

In this case also, regardless of whether the downstream end is in single bearing or in double axial bearing in contact with tab 276, it can be machined to reinforce the seal for example such that each bearing is convex in shape, said to be "in arc".

Still with reference to this FIG. 4, the fourth stage 20D is located downstream from the third stage 20C at the rear end of the low pressure turbine module of which it forms the last stage. This stage 20D and the other two upstream stages 20B, 20C are similar. Thus, each element in stage 20D that is identical to or similar to an element in stage 20B or 200 is assigned a numeric reference formed by adding "2" hundred to the number of the element in stage 20B or 20C.

This stage 20D is provided with a nozzle 262 that is also annular, for example made in a single piece.

The nozzle 262 has an external annular structure 266 from which the nozzle blades 270 project radially inwards. An internal structure is also provided supporting the blade shanks and arranged around a hub (not shown) of the bladed mobile wheel 272 of this stage. The blades 274 of the wheel 272 are formed downstream from the nozzle blades 270.

The external structure 266 has the upstream tab 276 described above that extends radially outwards. The free end of the upstream tab 276 is facing and at a radial distance from the case 2, given that no contact is desired with this case.

The upstream annular tab 276 extends radially from an external ring 283 delimiting the primary flow, on which the blades 270 are added.

The structure 266 also has a downstream annular tab 285 downstream from the tab 276, extending radially outwards in the downstream direction from the ring 283. Its external end is also facing and at a distance from the case 2, since no contact is desired with this case.

Thus, the downstream annular tab 285, the upstream annular tab 276, the external ring 283 and the annular portion of the case 2 extending adjacent to these elements together form an upstream annular cooling air circulation cavity 291 inside which air 54 penetrates through holes 195, and circulates to cool all adjacent elements.

Air 54 then propagates in the downstream direction above the tab 285, under the case 2, close to a conventional system preventing rotation of the nozzle, comprising pins mounted on the case.

For each external structure 266, a contact surface 284 is provided extending in the axial downstream direction from a free end of the downstream tab 285. This contact surface 284 is lined with an abradable element 286 on the inside in radial contact with the tips of blades 274. Thus, these tips comprise squealer tips contacting the abradable element 286, preferably made of a honeycomb material.

In its median part, the contact surface 284 is provided with a serrated annular protuberance 261 bearing axially on an annular stop 8a provided on the assembly flange of the ejection case 8. The axial force applied on the blades 270 by gases pushes the nozzle 262 in the downstream direction, increasing the contact pressure between the protuberance 261 and the stop 8a.

Furthermore, to prevent the downstream end 292 of the contact surface 284 from opening too far in the radially outwards direction, this movement is stopped by a radial stop provided on the case 8, which in this case is in the form of a reaming 293 centred on the turbine axis.

The annular contact surface 284 forms a downstream annular cooling air circulation cavity 294 into which air penetrates from the radial end of the downstream tab 285, jointly with the annular portions of the cases 2 and 8 extending adjacent to this contact surface.

Air circulates inside this cavity 294 in the downstream direction through the serrated protuberance 261, under the assembly flanges of cases 2, 8.

Air 54 then propagates in the downstream direction passing through and cooling the radial contact between the downstream end 292 and the reaming 293, through the crescent-shaped openings 263 formed on one and/or the other of these two elements.

Thus as mentioned above, air 54 cools the three stages 20B, 20C, 20D in cascade before escaping in the downstream direction through the ejection case 8.

The radial contact observed at the reaming 293 is only slightly affected by the temperature due to its innovative design, its distance from the turbine axis, and due to the annular contact surface 284 also acting as a thermal shield for it, as can be seen in FIG. 4. Furthermore, the passage of cooling air 54 at this contact enables control of its temperature. The passage of air 54 in the narrow downstream portion of the cavity 291 also limits thermal expansion of the contact surface 284 that delimits this downstream cavity portion with the flange, and therefore better controls the clearance with the tips of blades 274.

Figure 5:
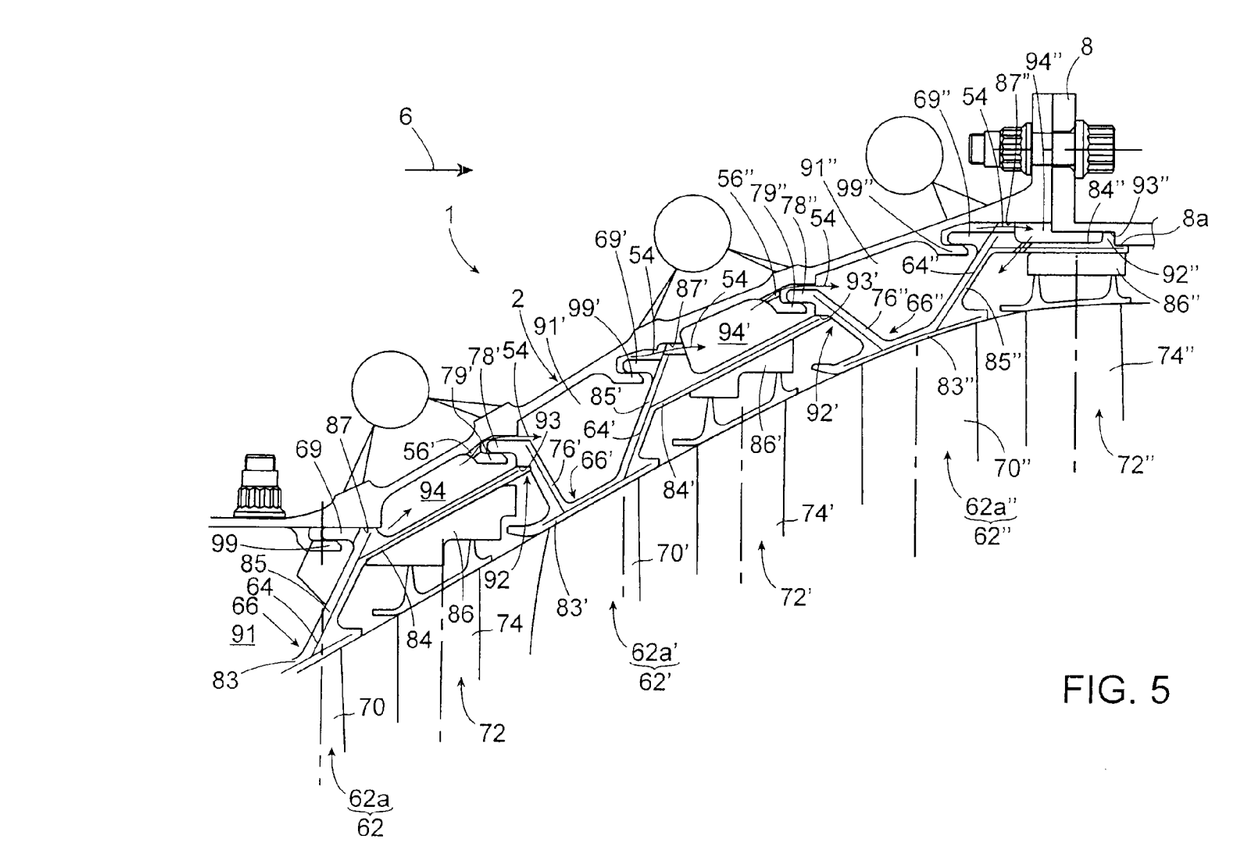
FIG. 5 shows a partial axial half-sectional view of a low pressure turbine in an aircraft turbojet, according to a second preferred embodiment of this invention.

Now with reference to FIG. 5, the figure shows a low pressure turbine 1 of an aircraft turbojet according to a second preferred embodiment of this invention. This second embodiment has similarities to the first embodiment described above with reference to FIGS. 1 to 4.

In particular, the first stage is identical and is therefore not shown in FIG. 5. The second stage 20B is also almost identical to the second stage in the first embodiment, the only difference lying in the fact that the downstream end 92 of the contact surfaces 84 is now in radial bearing in contact with a reaming 93 of the downstream tab 76' of the nozzle of the next stage 20C, and no longer in radial bearing in contact with a reaming of the case. This tab 76' thus performs the radial bearing and axial bearing function.

Furthermore, the third stage 20C in this case is identical or similar in shape to the second stage 20B, particularly in that its nozzle 62' is segmented. Thus, in FIG. 5, each element in stage 20C that is identical to or similar to an element in stage 20B is assigned a numeric reference formed by adding the suffix "'" to the number of the element in stage 20B.

Therefore, the third stage is almost identical to the second stage, the only real difference consisting of making sure that the hook 79' that cooperates with the hook 78' is designed as a single piece with the case 2 and no longer added onto it. Furthermore, this hook 79' is provided with holes 56' through which cooling air 54 can pass between the annular cavities 94 and 91'.

Furthermore, as for the second stage, the downstream end 92' of the contact surfaces 84' is in radial bearing on a reaming 93' of the downstream tab 76" of the nozzle of the next stage 20D.

This stage 20D is also identical to or similar to the two previous stages 20B, 20C, particularly in the sense that its nozzle 62" is segmented. Thus, in FIG. 5, each element in stage 20D that is identical to or similar to an element in stage 20B or 20C is assigned a numeric reference formed by adding the suffix "''" to the number of the element in stage 20B or 20C.

Therefore, stage 20D is practically identical to the third stage 20C, particularly with a hook 79" that cooperates with the hook 78" and that is designed as a single piece with the case 2, and is also provided with holes 56' through which cooling air 54 passes between the annular cavities 94' and 91".

The only real difference in design is at the downstream end 92" of the contact surfaces 84" that is in axial bearing in contact with an annular stop 8a formed on the ejection case 8. The reaming 93" acting in radial bearing at this end 92" is also provided on this same case 8a.

In this case, the number of nozzle segments is identical in the three stages 20B, 20C and 20D. The segments are then fixed at an angular space in the same way, so that they are facing each other in pairs along the axial direction.

Obviously, those skilled in the art could make various modifications to the invention that has just been described, solely as non-limitative examples. In particular, the characteristics of the two embodiments described can be combined without going outside the scope of the invention.

The invention claimed is:

1. A low pressure turbine of a turbomachine comprising a stator provided with a case, a nozzle belonging to an upstream stage and a nozzle belonging to a downstream stage, each of the two stages housed in the case also comprising a bladed mobile wheel arranged downstream from the nozzle of its stage, the nozzle of the upstream stage being segmented so as to form angular nozzle segments each with an external structure from which nozzle blades project radially inwards, wherein each external structure comprises:
    a first tab bearing radially on a hook on the stator fixed to the case,
    a second tab bearing radially on a reaming in the case, said first and second tabs of the external structures of the segments delimiting an annular upstream cooling air circulation cavity, jointly with said case,
    a contact surface extending in the downstream direction from the second tab and lined with an abradable element on the inside in contact with the mobile wheel of the upstream stage, said contact surface comprising a downstream end bearing axially on the nozzle of said downstream stage and bearing radially on a stop of the case or said nozzle in the downstream stage, the contact surfaces of the external structures of the segments cooperating with said case, to delimit an annular downstream cooling air circulation cavity communicating via a passage with said upstream cavity.

2. A turbine according to claim 1, wherein the nozzle in the downstream stage is segmented so as to form angular nozzle segments, or is in the shape of an annular part.

3. The turbine according to claim 1 or claim 2, wherein the nozzle of said downstream stage has an external structure from which the nozzle blades project radially inwards, said external structure comprising:
 a first annular tab on which said downstream end of the contact surfaces of the segments bears axially, and
 a second annular tab delimiting an upstream annular cooling air circulation cavity jointly with said first annular tab and said case, the cavity communicating with said downstream cooling air circulation cavity of the nozzle in the upstream stage.

4. The turbine according to claim 3, wherein the downstream ends of the contact surfaces of the segments in the nozzle in the upstream stage, bearing axially on said first annular tab of the nozzle in the downstream stage, cooperate with this first annular tab to define an annular pressurisation cavity containing cooling air from said downstream cavity, so as to limit the air leakage flow from the upstream cavity of the nozzle in the downstream stage to the primary flow, between the nozzles in the upstream stage and the downstream stage.

5. The turbine according to claim 4, wherein the downstream end of the contact surfaces of the segments in the nozzle in the upstream stage is generally U or C shaped with the open part facing downstream, the two ends of the U or C bearing axially on said first annular tab of the nozzle in the downstream stage.

6. The turbine according to claim 1, for wherein each external structure, said first tab, said second tab and said contact surface are made of a single part with an external ring segment from which nozzle blades project radially inwards.

7. The turbine according to claim 1, wherein said stop, on which said downstream end of the contact surface bears radially, is a reaming made on the case or on the nozzle in the downstream stage.

8. The turbine according to claim 1, wherein the stator hook on which the first tab bears radially, is made of a single part with the case or is added onto this case.

9. The turbine according to claim 1, wherein the case also comprises an axial stop facing said downstream end of the contact surface and at a distance from it, in the direction opposite the nozzle in the downstream stage.

10. A turbomachine comprising a low pressure turbine according to claim 1.

11. The turbine according to claim 1, wherein said downstream end forms a leak tight axial contact with the nozzle of said downstream stage, said leak tight axial contact being configured to limit leaks from a primary flow between the nozzles of said upstream and downstream stages.

* * * * *